Figure 11:
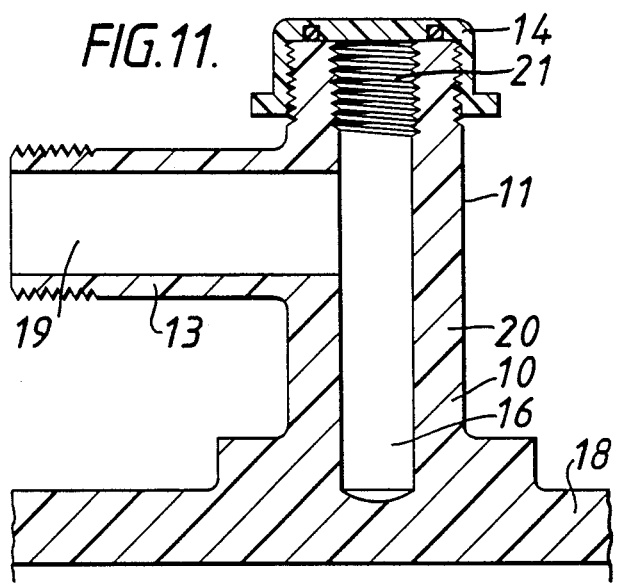

United States Patent [19]

Monrose

[11] Patent Number: 4,960,155

[45] Date of Patent: Oct. 2, 1990

[54] DEVICE FOR PERMITTING A FIRST LENGTH OF PREVIOUSLY COMMISSIONED MAIN TO BE EXTENDED BY CONNECTING A SECOND LENGTH OF MAIN THERETO

[75] Inventor: Russell J. Monrose, Brentwood, England

[73] Assignee: British Gas plc, England

[21] Appl. No.: 228,674

[22] Filed: Aug. 5, 1988

[30] Foreign Application Priority Data

Aug. 5, 1987 [GB] United Kingdom ............... 8718561
Aug. 27, 1987 [GB] United Kingdom ............... 8720187

[51] Int. Cl.$^5$ .................. F16L 9/00; F16K 11/07
[52] U.S. Cl. .................................. 138/178; 138/89; 138/97; 285/15; 137/318
[58] Field of Search .................. 138/178, 103, 97, 98, 138/89, 92; 137/315, 318, 15; 285/15

[56] References Cited

U.S. PATENT DOCUMENTS

| | | | |
|---|---|---|---|
| 992,975 | 5/1911 | Mueller | 137/318 |
| 2,983,477 | 5/1961 | Merrill | 137/318 |
| 3,104,456 | 9/1963 | Powell | 137/15 |
| 3,433,103 | 3/1969 | Waite | 137/318 |
| 3,552,441 | 1/1971 | Luhleich | 137/318 |
| 3,692,044 | 9/1972 | Wise | 137/318 |
| 3,771,546 | 11/1973 | Roos | 137/318 |
| 4,281,775 | 8/1981 | Turner | 137/318 |
| 4,335,757 | 6/1982 | Lankston | 138/97 |
| 4,437,494 | 3/1984 | Soper et al. | |

FOREIGN PATENT DOCUMENTS 2531058 12/1976 Fed. Rep. of Germany ...... 137/318
1409553 10/1975 United Kingdom .

Primary Examiner—James E. Bryant, III
Attorney, Agent, or Firm—Larson and Taylor

[57] ABSTRACT

A device is provided for permitting a first length of previously commissioned main to be extended by connecting a second length of main thereto, the device comprising a duct 1 having an inlet 2 for connection to the first length of main before it has been commissioned and an outlet 3 for connection to the second length of main after the first length of main has been commissioned, the outlet 3 being isolated from the inlet 2 by a barrier or wall 24 which may be punctured after the outlet 3 has been connected to the second length of main to effect communication between the inlet 2 and the outlet 3.

5 Claims, 6 Drawing Sheets

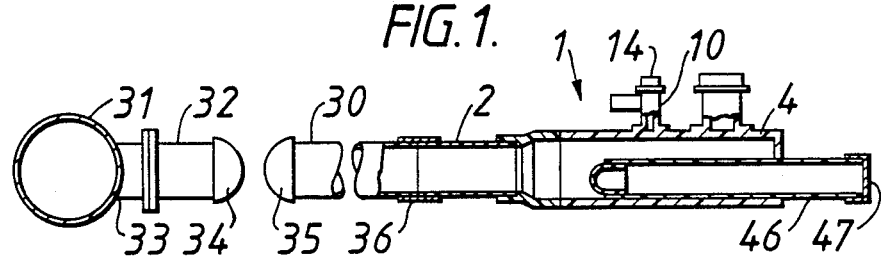
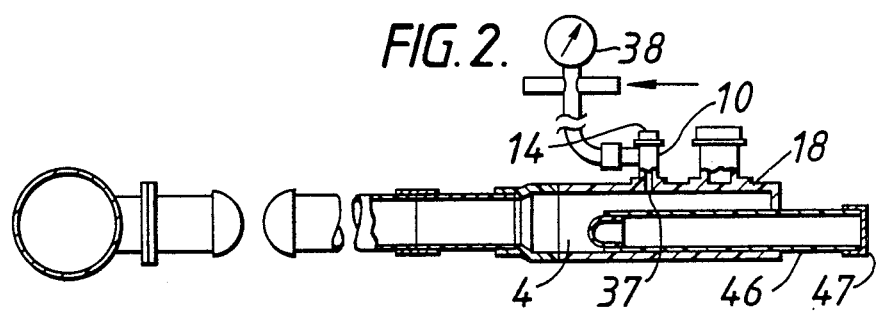
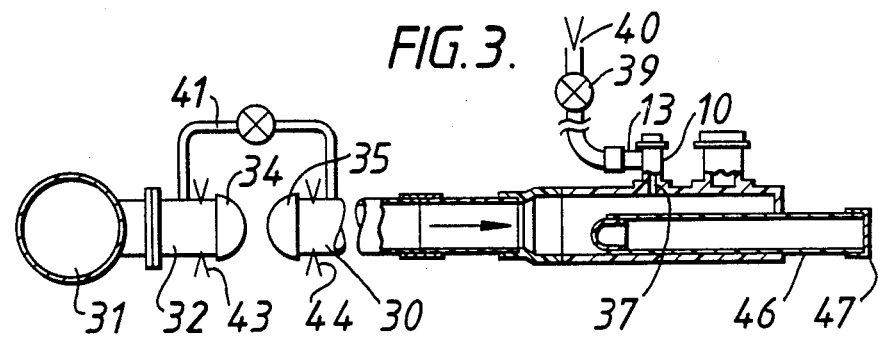
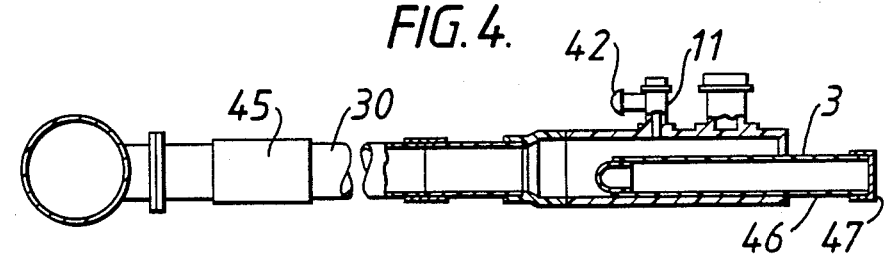

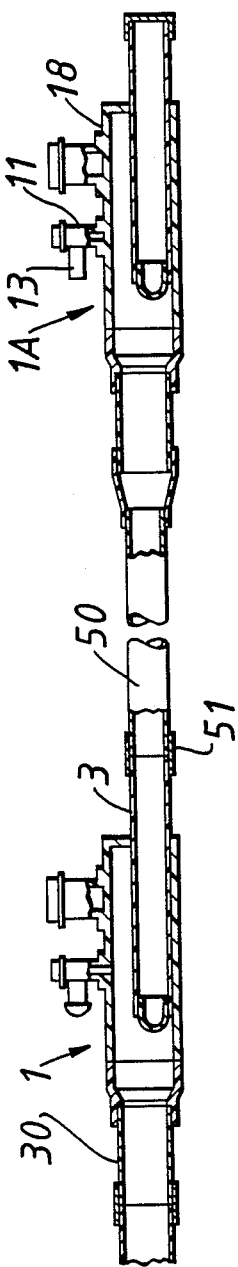
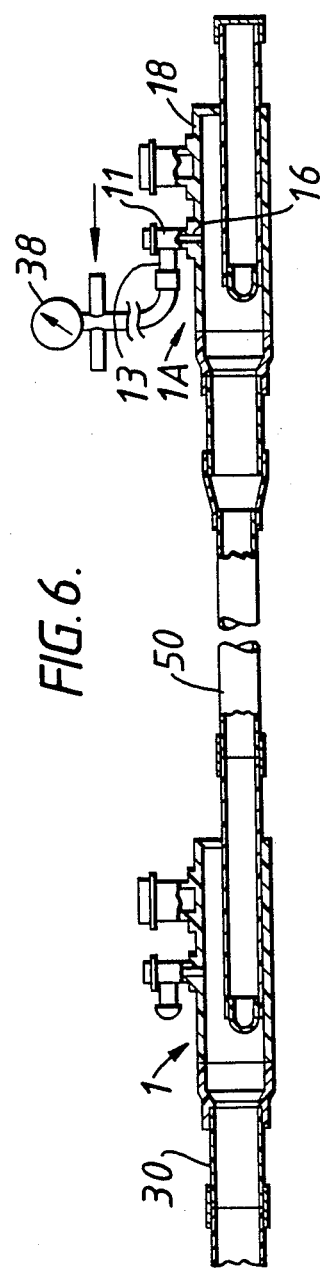

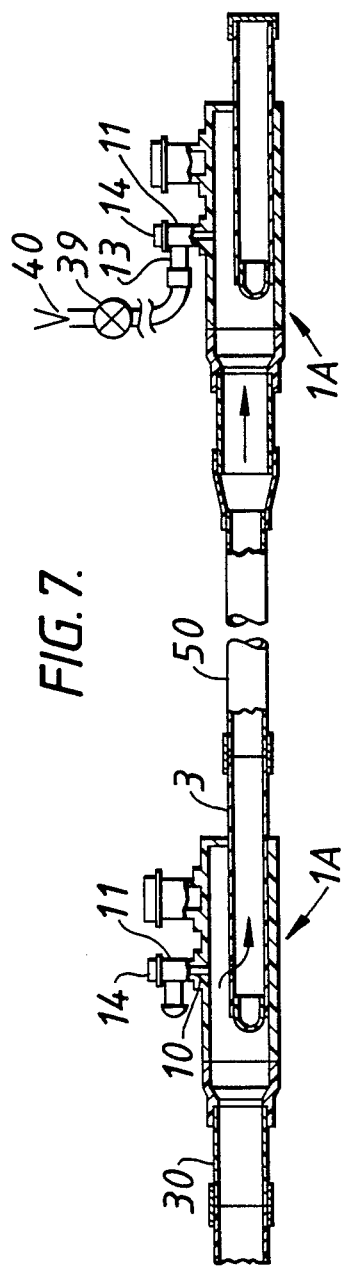
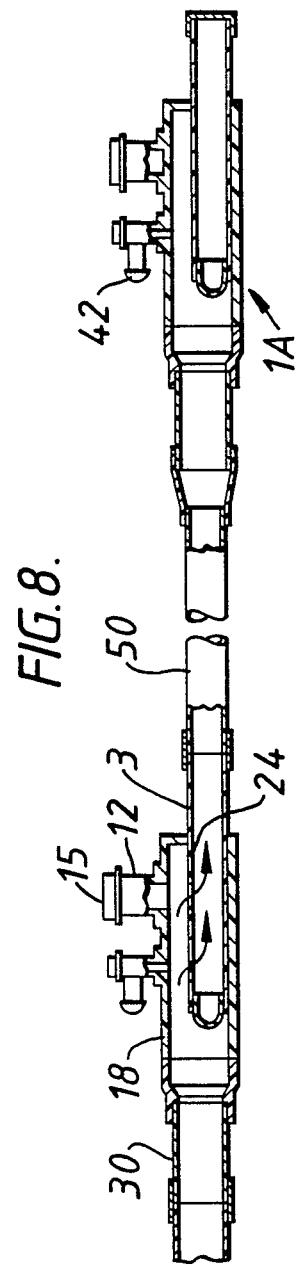

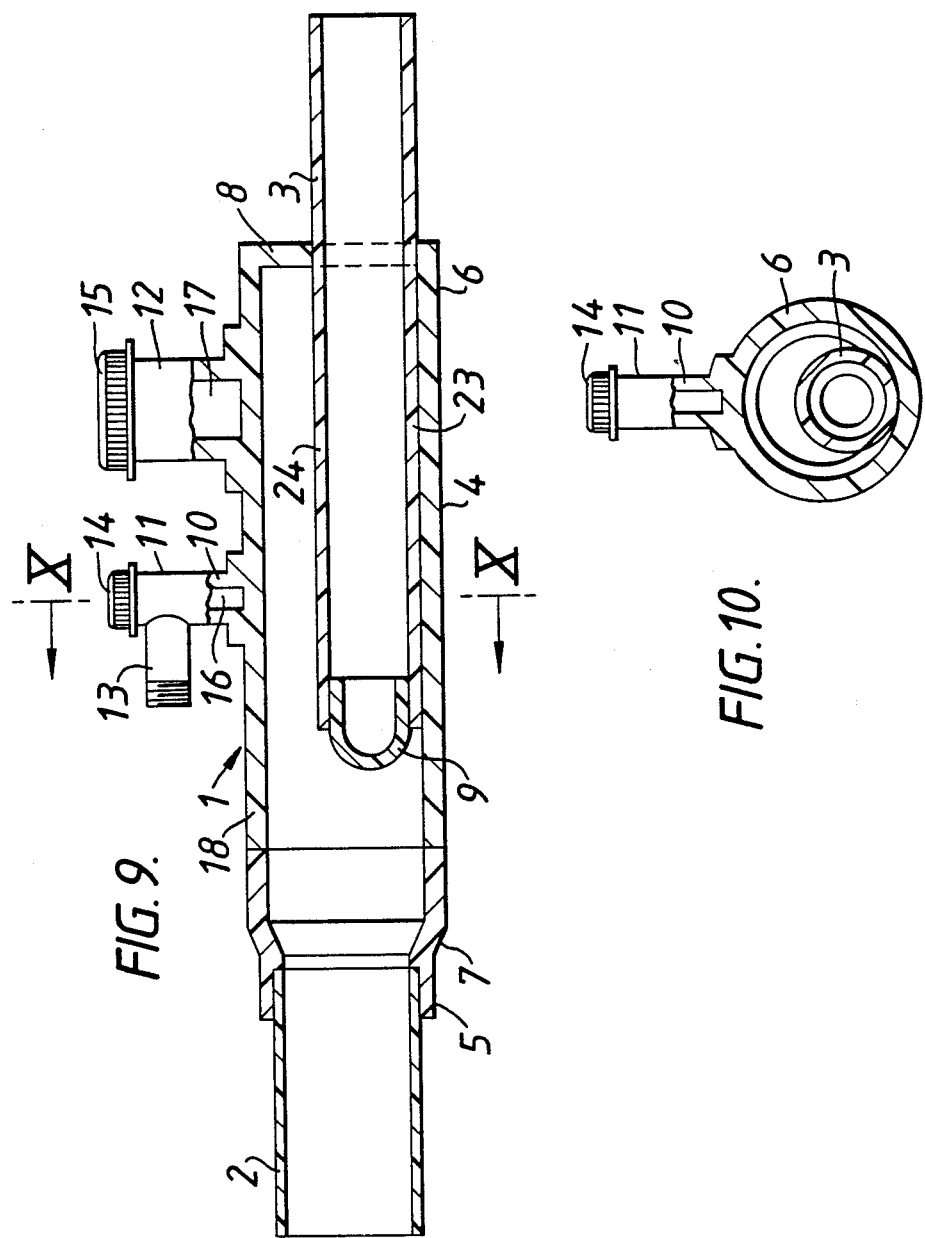

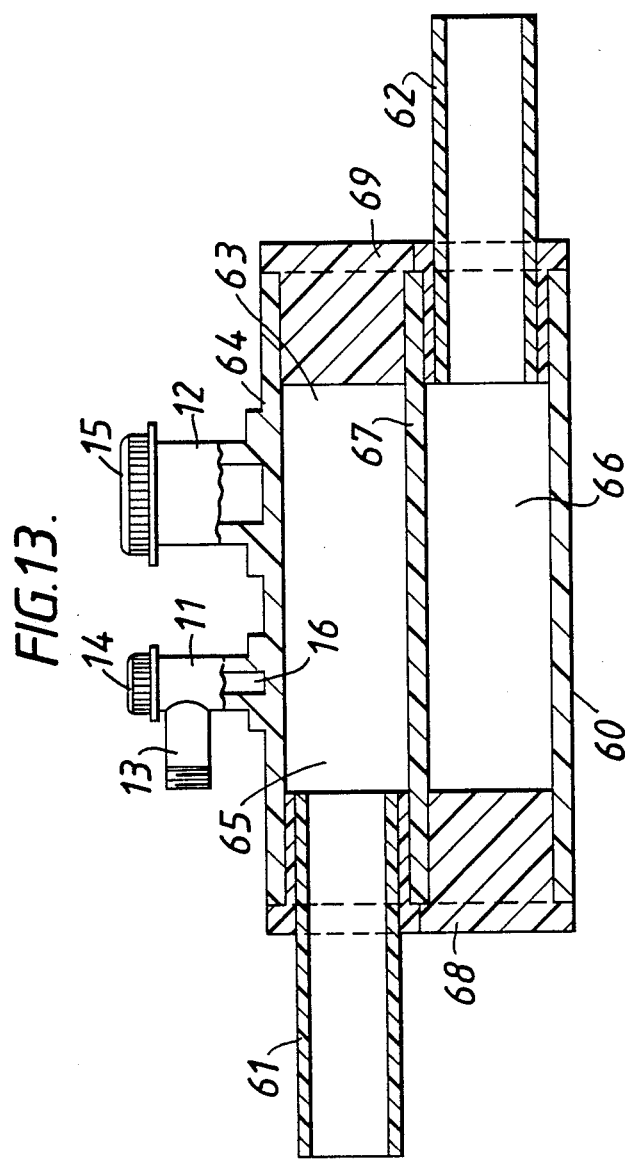

DEVICE FOR PERMITTING A FIRST LENGTH OF PREVIOUSLY COMMISSIONED MAIN TO BE EXTENDED BY CONNECTING A SECOND LENGTH OF MAIN THERETO

The present invention relates to a device for permitting a of previously commissioned main to be extended by connecting a second length of main thereto.

By the term "commissioned" we mean that the main is in use and fluid is currently flowing along it.

In the gas and water industries a regular feature of distribution operations is the laying and commissioning of new or replacement mains to extend the length of a main.

Whenever a first length of previously commissioned main is to be extended by connecting a second length of main thereto, it is necessary to stop off the flow of the fluid along the old section before connecting the new section to it.

The method of stopping off depends upon the material and diameter of the main to be stopped off. If the main is of polyethylene, it is usually squeezed flat (squeezed off) using special tools. If however, the main is of too large diameter to be squeezed flat the main may be stopped off by inserting inflatable bags into the main and then inflating the bags. The latter method is also used in the stopping off of metallic pipes.

In order to use either of the above stopping off methods described above, it is necessary to expose a substantial part of the old main section so that considerable excavation and reinstatement is associated wth the prior methods leading to connection being a high cost exercise.

It is therefore an object of the present invention to reduce the cost of main connection by providing means whereby a first length of previously commissioned main can be extended by connecting a second length of main to the first main without stopping off the flow of the fluid along the first length of main.

According to the present invention a device is provided for permitting a first length of previously commissioned main to be extended by connecting a second length of main thereto, the device comprising a duct having an inlet for connection to the first length of main before it has been commissioned and an outlet for connection to the second length of main after the first length of main has been commissioned, the outlet being isolated from the inlet by a barrier or wall which may be punctured or displaced after the outlet has been connected to the second length of main to effect communication between the inlet and the outlet.

In use, whenever a section of main is laid it is provided with a device whose inlet is connected to the far end of the main before commissioning . In this case the device serves as a closure which may be permanent or temporary depending upon whether the first section is to be extended by connection to a second or subsequent section of main. If a second or subsequent section is to be joined to the first section, the second or subsequent section is connected to the outlet of the device and the wall punctured to effect communication between the sections of main without the need to stop off the flow of fluid through the first section.

Figure 12:
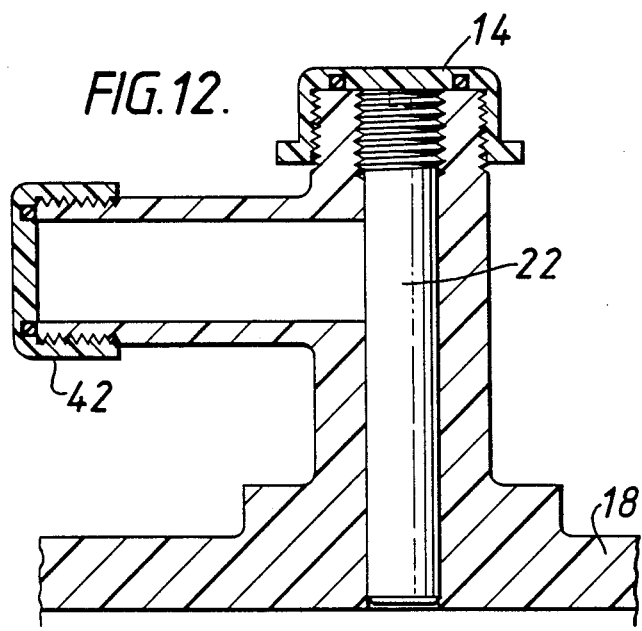

Embodiments of the invention will now be particularly described with reference to the accompanying drawings in which:

FIGS. 1 to 4 show the stages involved in the commissioning of first length of main to which the device has been fitted, FIGS. 5 to 8 show the stages involved in the connection of a second length of main to the now commissioned first length of main and in the commissioning of the second length of main, FIG. 9 is a generally longitudinal sectional view through a first embodiment of the device, FIG. 10 is a view along the lines X—X of FIG. 9, FIG. 11 is an enlarged fragmentary sectional view of the tee shown in FIG. 10, FIG. 12 is a view similar to FIG. 11 showing a.bore blocking member in the tee through-portion and a cap closing the side branch portion of the tee, FIG. 13 is a generally longitudinal sectional view through a second embodiment of the device.

In the embodiments shown in FIGS. 9 and 10 and 13, the devices are shown in the "as received" state i.e. before they have been connected to the first length of main and comprise a duct of a suitable plastics material such as polyethylene. In fact nowadays, the vast majority of gas and water distribution mains themselves comprise this material.

Referring to FIGS. 9 to 12 a first embodiment of the device comprises a duct 1 with a tubular inlet 2 for connection to the first length of main before the latter has been commissioned, a tubular outlet 3 for connection to the second or subsequent length of main after the first length has been commissioned and a chamber 4 linking the inlet 2 to the outlet 3.

The chamber 4 is of generally tubular form and comprises a portion 5 forming an inlet end of the chamber 4 and a portion 6 forming an outlet end of the chamber 4. The portion 5 is of smaller diameter than the portion 6 and is joined thereto by a tapering intermediate portion 7.

The inlet 2 is joined to the portion 5 which serves as a sleeve to receive the inlet 2.

The outlet 3 extends into the larger portion 6 of the chamber 4 by way of an aperture in a wall 8 in the far end of the portion 6, the outlet 3 otherwise forming a fluid tight seal with the edge of the aperture in the wall 8. That end of the outlet 3 located within the chamber 4 is permanently closed off by a cap 9 which is welded to the outlet 3.

Extending radially from the wall of the larger chamber portion 6 are respectively, the through-portion 10 of a tee 11 and a tubular member 12, the bore diameter of the member 12 being substantially greater than that of the tee 11 and in fact approximating to the internal diameter of the main to which the device is to be connected.

The end of the side branch portion 13 of the tee 11 is externally threaded for connection to standard air test and gas purge equipment (as will be subsequently described). In addition the ends of the tee through-portion 10 and of the member 12 are externally threaded for receiving respective closure caps 14 and 15 as shown.

As received, the bores 16 and 17 in the tee through-portion 10 and member 12 are blind and terminate at the outer wall 18 of the chamber 4. As received the bore 19 in the side branch portion 13 of the tee 11 is also blind as shown in FIG. 11 and terminates at the wall 20 of the through-portion 10. The bore 16 of the through-portion 10 is threaded at its upper end 21 to receive a bore blocking member 22 (FIG. 12) as will be subsequently described.

The portion 23 of the outlet 3 lying within the chamber 4 serves to isolate the outlet 3 from the inlet 2 until the outer wall 24 of the outlet portion 23 is punctured. As shown the portion 23 lies immediately beneath the tee through-portion 10 and the member 12 and may be punctured by drills which can reach the portion 23 by way of either of the bores 16,17 in the tee through-portion 10 or the member 12. In this case of course, the drills must first penetrate the chamber wall 18. When suitably punctured, aperture(s) in the outlet portion 23 permit(s) fluid communication between the inlet 1 and the outlet 2.

In FIGS. 1 to 4 gas services are being provided for the first time to say a new housing estate and to achieve this end a first length of polyethylene main 30 will need to be connected as a radial spur to an existing feeder main 31 and then air tested, air purged and finally commissioned.

As a first stage (FIG. 1) a standard offtake 32 is connected to a suitable spur 33 of the feeder main 31 and the offtake 32 is then sealed with a cap 34. The main 30 is then laid with the end nearer to the feeder main 31 sealed with a cap 35 and with its other end connected to the inlet 2 of an "as-received" device 1 by means of a polyethylene connecting sleeve 36 fused to the main 30 and to the device 1.

In the next stage (FIG. 2) the main 30 is subjected to a standard air pressure test for fluid tightness. The tee cap 14 is removed from the tee 10 and a suitable drill (not shown) is inserted into the bore of the tee through-portion 10 to drill a hole 37 through the outer wall 18 of the chamber 4 as shown; once this hole 37 has been made the drilling tool is raised and the standard air-pressure test equipment is connected to the tee side branch portion 13.

The interior of the main 30 can now communicate with the tee side branch portion 13 to perform the pressure test. Following the test the equipment 38 is removed.

Next (FIG. 3) the main 30 is purged of air. The side branch portion 13 of the tee 10 is now connected to an assembly of a standard purge valve 39 and flame trap 40. A rider 41 is then connected between the offtake 32 and the new main 30 to permit gas from the feeder main 31 to enter the new main 30 and purge the main 30 through the drilling 37 in the tee 11.

After purging (FIG. 4) the gas purge assembly 39,40 is removed and the end of the side branch portion 13 of the tee 11 is sealed with a cap 42. The end of the offtake 32 and the adjoining end of the main 30 are then squeezed off (as shown schematically at 43,44 in FIG. 3) and the rider 41 is removed together with the caps 34 and 35. The offtake 32 and main 30 is then joined together as conventional by a standard polyethylene connecting sleeve 45 fused to the offtake and the squeeze offs removed. The new main 30 is therefore at this stage fully commissioned with the device 1 serving as a temporary (or if the main 30 is not to be extended permanent) closure. To prevent ingress of dirt into the outlet 3, the end 46 beyond the chamber 4 is sealed with a push-fit temporary cap 47, when "as received".

Suppose now that the first length of main 30 is to be extended by connecting a second length of polyethylene main to the first length as the demand for services increases with growth of the housing estate. It now becomes possible to connect the second length to the first length without having to squeeze off the first length to do so.

Referring to FIG. 5 as a first stage, the second length of main 50 is connected to the device outlet 3 by a standard polyethylene connecting sleeve 51 fused to the outlet 3 and the near end of the main 50. In order to do this, the temporary cap 47 at the end 46 of the outlet 3 must first be removed. Note that a further device 1A identical to device 1 has already been connected to the far end of the second main 50, the device 1A acting at this stage as a closure to that end.

Referring to FIG. 6, the new length of main 50 is now subjected to the standard fluid tightness air pressure test already described above. In this case drillings are made in the outer wall 18 of the second device 1A via the bore 16 in the tee-through-portion 11 and through the wall of the tee through portion 11 via the bore in the side branch portion 13 of the tee 11. The air pressure test equipment 38 is then connected to the side branch portion 13 as shown and the test performed. The test equipment 38 is then removed.

Next (FIG. 7) the new length of main 50 is purged of air. Firstly the standard purge valve and flame trap assembly 39,40 is connected to the side branch portion 13 of the tee 11 in device 1A as shown. Next a hole is drilled in the outlet portion 3 of the device 1 to allow gas in the first length of main 30 to enter the outlet 3 of the device 1 and then flow along the new main 50 into the chamber 4 of the new device 1A and out through the purge valve/flame trap assembly 39/40. The drilling in device 1 is made with a drill extending into the chamber 4 via the through-portion 10 of the tee 11 from which the cap 14 has been removed. The purge valve/flame trap assembly 39,40 assembly is then removed from the side branch portion 13 of device 1A and the portion 13 is capped with a cap 42 as shown in FIG. 8. The bore blocking member 22 may then be positioned within the through-portion 10 of the tee 11 in device 1 and the cap 14 replaced.

Finally (FIG. 8) a larger diameter drilling is made in the outlet portion 3 of device 1 via the member 12 from which the cap 15 has been removed using a large diameter drill which drills a hole in the outer wall 18 of the chamber 4 and then drills a hole in the wall 22 of the outlet portion 3. This permits gas to flow between the mains 30 and 50 at a fully commissioned rate.

After the drillings have been made the cap 15 is replaced.

The procedure described with reference to FIGS. 5 to 8 is repeated when ever a previously commissioned main is to be extended by connecting to it a further length of main.

Referring to FIG. 13 a second embodiment of the device comprises a duct 60 with a tubular inlet 61 for connection to the first length of main before the latter has been commissioned, a tubular outlet 62 for connection to the second or subsequent length of main after the first length has been commissioned and a chamber 63 with which the inlet 61 and outlet 62 communicate.

The chamber 63 has a generally tubular wall 64 forming two compartments 65 and 66 respectively which are isolated from each other by a flat common horizontal dividing wall 67. The chamber 63 is formed at either end with walls 68 and 69, the inlet 61 extending through one end wall 68 into the upper compartment 65 of the chamber 63 and the outlet 62 extending through the other end wall 69 into the lower compartment 66 of the chamber 63.

Extending radially upwardly from the tubular wall 64 of the chamber 63 are respectively the through-portion 10 of a tee 11 and a tubular member 12 which components are very similar to the like components previously described in the device shown in FIGS. 9 to 12 and therefore these components bear similar reference marks.

In order to connect the side branch portion 13 of the tee 11 to the first length of main for air pressure testing and purging purposes (not shown), a drilling must be made in the wall 64 of the chamber 63 by way of the bore 16 in the tee-through portion 10. Subsequently if and when a further section of main is to be connected to the outlet 62 drillings will be made in the dividing wall 67 of the chamber 63 to connect the inlet 61 to the outlet 62. These drillings will be made by way of the through portion 11 of the tee 10 when it is desired to purge the second length of main and via the tubular member 12 when the second length of main is to be fully commissioned.

I claim:

1. A device by which a second length of main can be connected to a first length of previously commissioned main to extend the main, said device comprising:
   a duct having a solid outer wall, an inlet for connection to the first length of main, and an outlet for connection to the second length of main;
   a solid barrier wall which is fixedly located with respect to the outer wall and which extends across the interior of the duct so as to block off communication between the inlet and the outlet; and
   two ports on the exterior of the outer wall of the duct, each port being closed by portions of the outer walls, said portions defining respective penetrable regions on the outer wall through which tools can penetrate to the interior of the duct, one of the regions having a relatively small penetrable area and the other region having a relatively large penetrable area, the solid barrier wall having two areas from which respective wall portions are removable by the tools to leave, on retraction of the tools, one of the two barrier wall areas defining a relatively small sized open hole and the other of the two barrier wall areas defining a relatively large sized open hole, thereby to effect two routes of communication between the inlet and the outlet.

2. A device as claimed in claim 1, in which each port comprises a tubular member which extends radially from the outer wall of the duct.

3. A device as claimed in claim 2, in which the tubular member associated with the relatively small penetrable area comprises a tee.

4. A device as claimed in claim 1, in which the solid barrier wall forms part of the outlet.

5. A device as claimed in claim 4, in which the outlet extends into the inlet.

* * * * *